(No Model.)
G. G. CRAMBERG & J. H. RANCK.
HARNESS.
No. 407,852. Patented July 30, 1889.
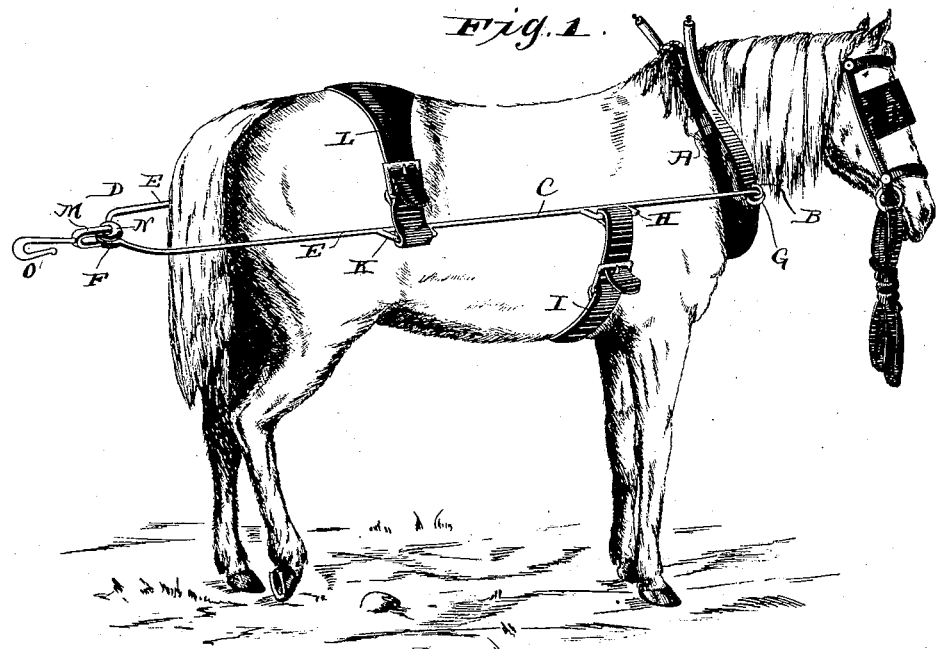
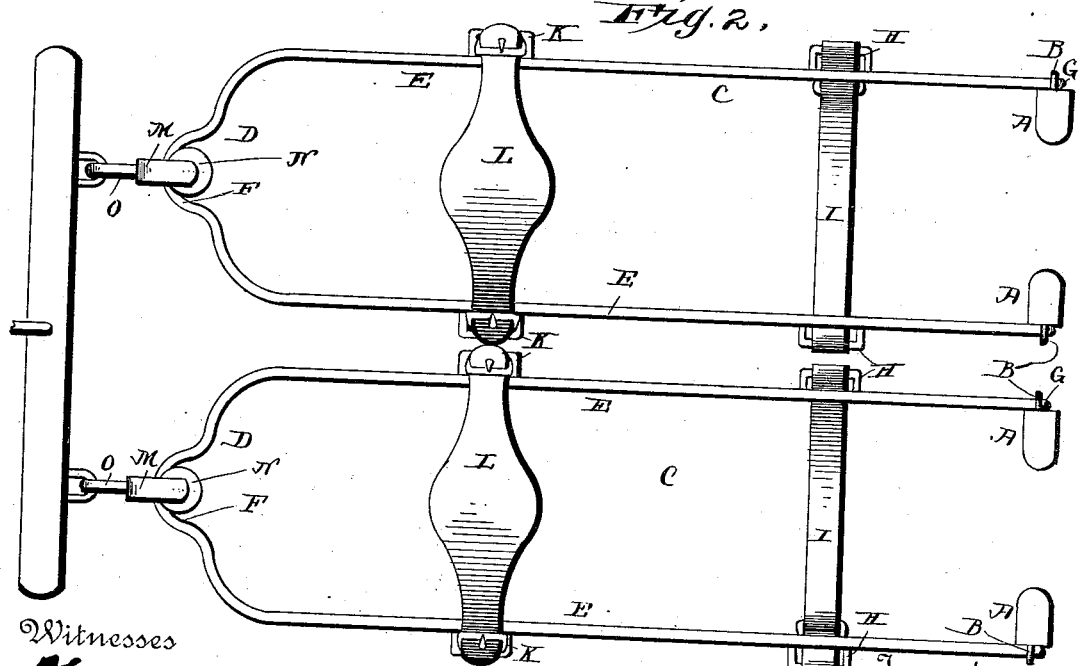

UNITED STATES PATENT OFFICE.

GEORGE G. CRAMBERG AND JOHN HENRY RANCK, OF DALLAS CITY, ILLINOIS.

HARNESS.

SPECIFICATION forming part of Letters Patent No. 407,852, dated July 30, 1889.

Application filed December 22, 1888. Serial No. 294,398. (No model.)

*To all whom it may concern:*

Be it known that we, GEORGE G. CRAMBERG and JOHN HENRY RANCK, citizens of the United States, residing at Dallas City, in the county of Hancock and State of Illinois, have invented new and useful Improvements in Harness, of which the following is a specification.

Our invention relates to improvements in harness; and it consists in the peculiar construction and combination of devices, that will be more fully set forth hereinafter, and particularly pointed out in the claim.

In the accompanying drawings, Figure 1 is a perspective view of a harness embodying our improvements. Fig. 2 is a top plan view of two sets of our harness, showing the manner of using the same with a double team.

A represents the hames, which are of the usual construction and are provided with the usual staples or keepers B.

C represents the tug, which is made from a single rod of iron, steel, or other suitable metal, of more than twice the length of a horse, and bent in the form shown to provide the semicircular rear portion D and the sides or arms E. In the center of the rear portion D is bent a semicircular rearwardly-extending offset F, and at the front ends of the arms or sides E are formed hooks or eyes G, which engage the staples or keepers B of the hames. The said arms or sides are provided, at a suitable distance from their front ends, with a pair of loops H, which retain the ends of a strap I, that is adapted to be buckled under the body of the animal just in rear of its front legs. The said sides or arms are further provided with a pair of loops K, which retain the ends of a back-strap L, which is adapted to be buckled over the back of the animal just in advance of its haunches.

M represents a draft band or strap having a pulley N journaled between its arms, which pulley engages the offset F, and swiveled to and extending rearward from the said band or strap is a draft-link O, which may be attached to a doubletree, as shown in Fig. 2; or if the harness is used singly the said link may be attached directly to the clevis of the plow or to the log-chain or other object to which the horse is hitched.

When hauling logs or drawing a plow or a vehicle that is not provided with a tongue or shafts, the whiffletree or doubletree, when an ordinary harness is employed, will drop as soon as the animal or animals cease to pull, and when the team is unhitched from the log and when the team is unhitched from the log or plow the whiffletree or doubletree will drag upon the ground and strike the heels of the animal. To avoid this, it has been heretofore necessary for the driver to lift and carry the whiffletree or doubletree in rear of the team, and as the doubletree used with a double team is very heavy this becomes very irksome and laborious. Another objection to an ordinary plow-harness is that the horse very frequently steps over one of the traces when the same becomes slack and much time is lost in getting the horse between the traces before again starting the plow. Our harness is not open to these objections, for the reason that the tug is substituted for the ordinary traces, and for the reason, further, that the back-band L suspends the tug and prevents the same from dropping when the horse ceases to pull. Owing to the rigidity of the tug the whiffletree or doubletree connected thereto will be supported at a considerable height above the ground when detached from the log, plow, or vehicle, and the driver will be thereby relieved of the necessity of carrying the same. Furthermore, it will be absolutely impossible for the horse to step out of the tug.

Having thus described our invention, we claim—

In a harness, the hames having the rings B, the rigid tug bent in U form and having its arms provided with the hooks engaging the rings and with the loops H K, said tug having the offset F in its rear portion, the belly and back bands attached to the loops H K, respectively, and each provided with buckles, whereby they may be adjusted, the strap or band M, having the roller N journaled therein and engaging the offset, and the hooked link attached to said strap and band, substantially as described.

In testimony that we claim the foregoing as our own we have hereto affixed our signatures in presence of two witnesses.

GEORGE G. CRAMBERG.
JOHN HENRY RANCK.

Witnesses:
BENONI MENDENHALL,
WILLIAM H. SCOTT.